(12) United States Patent
Osamura (10) Patent No.: US 11,483,138 B2
(45) Date of Patent: Oct. 25, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Toru Osamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 303 days.

(21) Appl. No.: 16/823,925

(22) Filed: Mar. 19, 2020

(65) Prior Publication Data

US 2021/0083860 A1 Mar. 18, 2021

(30) Foreign Application Priority Data

Sep. 12, 2019 (JP) .............................. JP2019-166071

(51) Int. Cl.
*H04L 9/08* (2006.01)
*H04L 9/32* (2006.01)
*H04L 9/00* (2022.01)

(52) U.S. Cl.
CPC .......... *H04L 9/0825* (2013.01); *H04L 9/0822* (2013.01); *H04L 9/3236* (2013.01); *H04L 9/50* (2022.05)

(58) Field of Classification Search
CPC .................. H04L 9/00–38; H04L 2209/00–88
See application file for complete search history.

(56) References Cited

U.S. PATENT DOCUMENTS

| 5,892,900 | A | * | 4/1999 | Ginter | ..................... G06F 21/78 726/26 |
| 7,613,746 | B2 | * | 11/2009 | Rudd | ................. H04N 1/00212 386/326 |
| 2018/0241551 | A1 | | 8/2018 | Fujimura et al. | |
| 2020/0160466 | A1 | * | 5/2020 | Hori | ......................... H04L 9/30 |
| 2021/0006408 | A1 | * | 1/2021 | Park | ...................... H04L 9/3236 |

FOREIGN PATENT DOCUMENTS

EP 2458853 A1 * 5/2012 ............. H04N 5/907
JP 2017-050763 A 3/2017

\* cited by examiner

*Primary Examiner* — John W Hayes
*Assistant Examiner* — Chenyuh Kuo
(74) *Attorney, Agent, or Firm* — Oliff PLC (57) ABSTRACT

An information processing apparatus includes a receiving unit, a dividing unit, an adding unit, and a transmitting unit. The receiving unit receives content which is a target of a blockchain. The dividing unit divides the content into content sections. The adding unit adds, to the content sections obtained through the division performed by the dividing unit, information for generating the content from the content sections. The transmitting unit transmits the content sections through the blockchain. The content sections have the information added by the adding unit.

3 Claims, 7 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-166071 filed Sep. 12, 2019.

BACKGROUND

(i) Technical Field

The present disclosure relates to an information processing apparatus and a non-transitory computer readable medium.

(ii) Related Art

Japanese Unexamined Patent Application Publication No. 2017-050763 discloses a technique which aims to apply, to content license management, the blockchain used in transactions of digital virtual currency. In the technique, a user terminal includes a key generating unit that generates a first key pair and a second key pair, a license request unit that transmits a license request which includes the public encryption key of the second key pair and which has been subjected to digital signing with the secret encryption of the first key pair, and a content using unit that obtains a content decryption key by using the secret decryption key of the second key pair from license information transmitted from a right holder terminal and that uses content. The right holder terminal includes a key management unit that stores a third key pair and the content decryption key, a license verifying unit that verifies the received license request, and a license issuing unit that encrypts the content decryption key by using the public encryption key of the second key pair included in the license request and that transmits the license information which includes the encrypted content decryption key and which has been subjected to digital signing with the secret encryption key of the third key pair. The license request and the license information are received/transmitted through the blockchain.

When the amount of content that is a target of the blockchain is not capable of being processed, the content is rejected without being regarded as a processing target.

SUMMARY

Aspects of non-limiting embodiments of the present disclosure relate to an information processing apparatus and a non-transitory computer readable medium which, when the amount of content that is a target of the blockchain is not capable of being processed, are capable of extending the range of the content amount, which is accepted as being a target of the blockchain, compared with the case in which such content is rejected uniformly.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a receiving unit, a dividing unit, an adding unit, and a transmitting unit. The receiving unit receives content which is a target of a blockchain. The dividing unit divides the content into content sections. The adding unit adds, to the content sections obtained through the division performed by the dividing unit, information for generating the content from the content sections. The transmitting unit transmits the content sections through the blockchain. The content sections have the information added by the adding unit.

BRIEF DESCRIPTION OF THE DRAWINGS

Exemplary embodiment of the present disclosure will be described in detail based on the following figures, wherein.

DETAILED DESCRIPTION

A suitable exemplary embodiment for implementing the present disclosure will be described below on the basis of the drawings.

Figure 1:
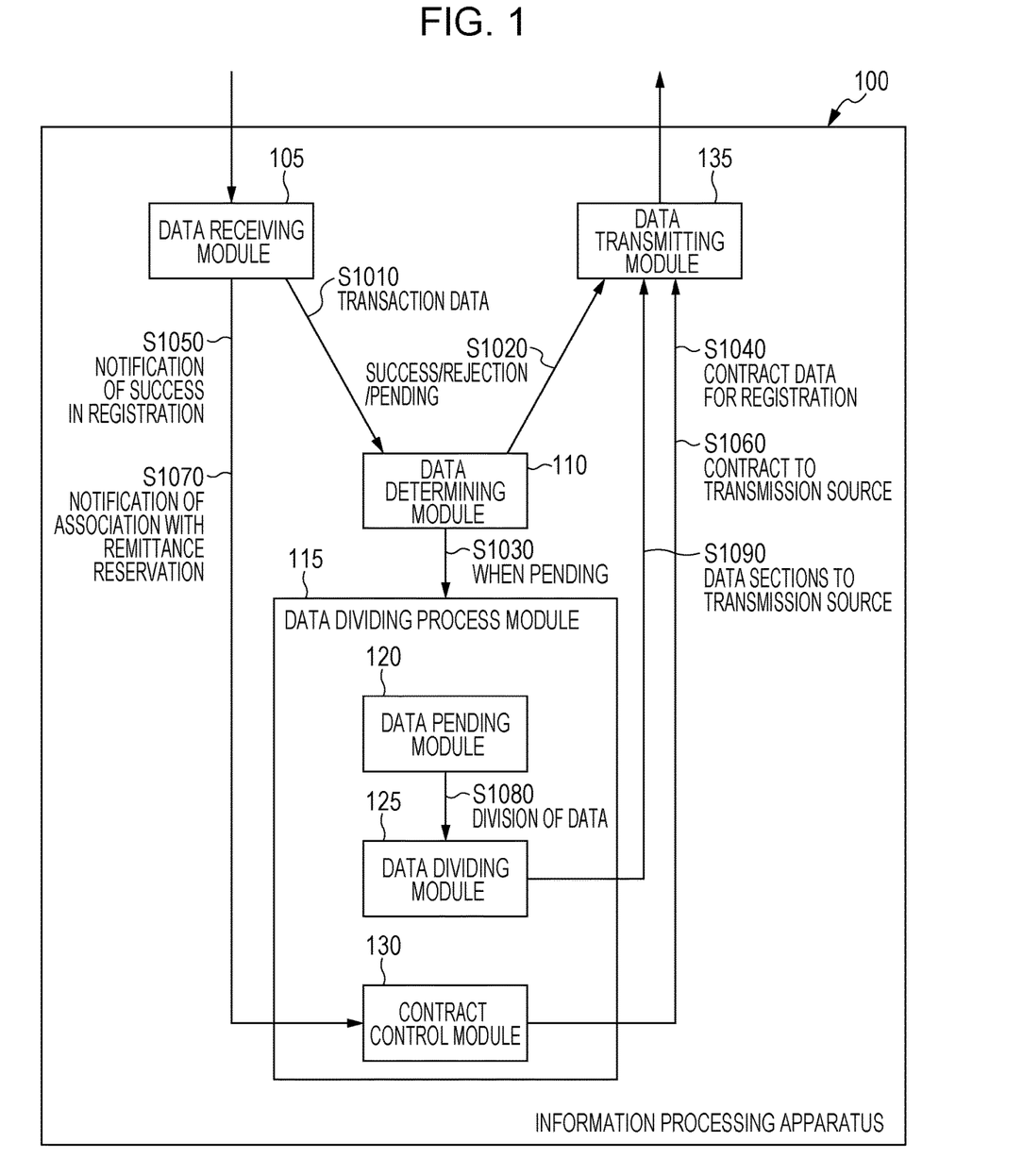
FIG. 1 is a schematic diagram illustrating an exemplary module configuration according to the present exemplary embodiment.

FIG. 1 is a schematic diagram illustrating an exemplary module configuration according to the present exemplary embodiment.

In general, a module refers to a component, such as software (including a computer program as an interpretation of "software"), which is logically separable, or hardware. Thus, a module in the present exemplary embodiment refers to not only a module in terms of a computer program but also a module in terms of a hardware configuration. Consequently, the present exemplary embodiment also describes a system, a method, and a computer program for functioning as a module (for example, a program that causes a computer to execute procedures, a program that causes a computer to function as units, or a program that causes a computer to implement functions). For convenience of explanation, the terms "to store something" and "to cause something to store something", and their equivalent terms are used. When the present exemplary embodiment is implemented by using computer programs, these terms mean that a storage device stores something or that a storage device is controlled so as to store something. One module may correspond to one function. However, in the implementation, one program may constitute one module, or one program may constitute multiple modules. In contrast, multiple programs may constitute a single module. Additionally, multiple modules may be executed by a single computer, or one module may be executed by multiple computers in a distributed or parallel processing environment. One module may include another module. Hereinafter, the term "connect" refers to logical connection, such as transmission/reception of data, an instruction, reference relationship between pieces of data, or login, as well as physical connection. The term "predetermined" refers to a state in which determination has been made before a target process. This term also includes a meaning in which determination has been made in accordance with the situation or state at that time or the situation or state before that time, not only before the process according to the present exemplary embodiment starts, but also before the target process starts even after the process according to the present exemplary embodiment has started. When there are multiple "predetermined values", these may be different from each other, or two or more of the values (the "two or more of the values" include all values, of course) may be the same. A description of "when A is satisfied, B is performed" is used as having a meaning of "Whether or not A is satisfied is determined and, when it is determined that A is satisfied, B is performed." However, this term does not include the case where the determination as to whether or not A is satisfied is unnecessary. In addition, the case in which things are listed, such as "A, B, and C", indicates exemplary listing unless otherwise noted, and includes the case in which only one member is selected (for example, only A).

A system or apparatus refers to one in which multiple computers, pieces of hardware, devices, and the like are connected to each other by using a communication unit such as a network (the "network" includes one-to-one communication connection), and also refers to one which is implemented by using a computer, a piece of hardware, a device, or the like. The terms "apparatus" and "system" are used as terms that are equivalent to each other. As a matter of course, the term "system" does not include what is nothing more than a social "mechanism" (that is, a social system) operating on man-made agreements.

For each of the processes performed by the respective modules, or for each of the processes if the processes are performed in a single module, target information is read out from a storage device. After the process is performed, the processing result is written in a storage device. Accordingly, a description about the reading of data from the storage device before the process and the writing into the storage device after the process may be skipped. Examples of the storage device may include a hard disk drive, a random access memory (RAM), an external storage medium, a storage apparatus via a communication line, and a register in a central processing unit (CPU).

An information processing apparatus 100 according to the present exemplary embodiment has processing functions for the blockchain, and, as illustrated in the example in FIG. 1, includes a data receiving module 105, a data determining module 110, a data dividing process module 115, and a data transmitting module 135.

The information processing apparatus 100 is included in a distributed ledger system in which data is not rewritable, and handles content whose amount is not capable of being processed in the blockchain. For example, the information processing apparatus 100 enables the blockchain to be applied also to log data, image data, audio data, video data, and the like which are other than use for the cryptocurrency or the fintech. The "content whose amount is not capable of being processed in the blockchain" corresponds to the case in which the amount itself of the content exceeds the amount defined in the standard of the blockchain (including one which may be regarded as the standard), or the case in which it is determined that the content is not capable of being processed due to the processing performance of a node which has received the content. For example, the transaction data for one transaction in Bitcoin□ is appropriately data of 300 to 400 bytes. Data whose amount is larger than this is difficult to be handled in the current blockchain.

Terminals, other than the terminal of the information processing apparatus 100, for handling the blockchain, for example, terminals for transmitting content, which is a target of the blockchain, and terminals for performing processes for the blockchain may perform processes equivalent to the blockchain processes of the related art. That is, the roles of the actors of the related art (for example, nodes, such as the data transmission source and miners) in the blockchain are not necessarily changed.

Owing to the dividing process, the information processing apparatus 100 may receive a reward from a transmission source of content.

The data receiving module 105 is connected to the data determining module 110 and a contract control module 130 of the data dividing process module 115. The data receiving module 105 receives data from a different node. For example, the data receiving module 105 receives content which is a target of the blockchain. In addition, the data receiving module 105 receives, from a different node, a message indicating, for example, success which indicates that content having been transmitted by the data transmitting module 135 is successfully stored in a block, or rejection which indicates that the content has failed to be stored in a block.

The data determining module 110 is connected to the data receiving module 105, the data dividing process module 115, and the data transmitting module 135. The data determining module 110 checks content received by the data receiving module 105. The data determining module 110 determines, as the check, whether or not the content is suitable as a target of the blockchain. For example, the data determining module 110 determines whether or not the amount of the content is equal to or larger than a predetermined amount. If the amount of the content is equal to or larger than the predetermined amount, the data determining module 110 determines pending, and transmits the content to the data dividing process module 115. In addition, the data determining module 110 transmits, to the data transmitting module 135, the check result indicating pending, as a reply to the node which has transmitted the content. When a request to store the content in a block is transmitted to a different node, the data receiving module 105 receives, from the node, a message indicating success, rejection, or the like. In this case, the message is transmitted as a reply to the node which has requested the information processing apparatus 100 to store the content in a block.

The data dividing process module 115, which includes a data pending module 120, a data dividing module 125, and the contract control module 130, is connected to the data determining module 110. The data dividing process module 115 performs processes related to division of content.

The data pending module 120 is connected to the data dividing module 125. The data pending module 120 stores content received from the data determining module 110. The data pending module 120 transmits the content to the data dividing module 125.

The data dividing module 125 is connected to the data pending module 120 and the data transmitting module 135. The data dividing module 125 has two functions, a dividing-process function and an adding-process function. The dividing-process function will be described. The data dividing module 125 divides content received by the data receiving module 105. In the dividing process, the content may be divided into pieces of data of a predetermined amount. In this case, the number of sections is different depending on the amount of the content. Alternatively, in the dividing process, the content may be divided into pieces of data whose number is predetermined. In this case, the number of sections is fixed, and the amount of each data section is different from that of another data section. Alternatively, for content in which multiple types of data are related to each other, a first type of data may be divided in accordance with the dates and times at which a second type of data is produced. For example, for content including audio data, which is produced by recording a certain situation, and image data, which is obtained through photographing as still images, the audio data may be divided in accordance with the dates and times at which the image data is captured through photographing.

The adding-process function included in the data dividing module 125 will be described. The data dividing module 125 adds, to content sections, information for generating the pre-division content from the content sections. This information may be used to restore the pre-division content (hereinafter also referred to as restore information). For example, (1) information indicating the original content uniquely, and (2) information indicating the order of division or the order of combination may be generated, and these pieces of information may be added to the content sections. In addition, (3) the total number of sections may be included.

The contract control module 130 is connected to the data receiving module 105 and the data transmitting module 135. The contract control module 130 exerts control related to the contract in the blockchain. The contract is also called the smart contract, and indicates a protocol with which a contract which is automatically carried out may be created. The smart contract created on the blockchain is a mechanism in which contract content is carried out according to programs and in which alteration and fraud after creation of a contract are impossible to perform.

The data transmitting module 135 is connected to the data determining module 110, and the data dividing module 125 and the contract control module 130 of the data dividing process module 115. The data transmitting module 135 transmits content parts, to which the data dividing module 125 adds the information, through the blockchain. Specifically, the data transmitting module 135 transmits, to a different node, content sections which are obtained through division performed by the data dividing module 125 and to which information indicating the combination order and the like has been added.

When the amount of content received by the data receiving module 105 is equal to or larger than the predetermined amount, the data transmitting module 135 transmits, to the transmission source of the content, information indicating pending.

The "predetermined amount" may be defined by using an amount, which the blockchain of the related art is capable of processing, or may be defined by using the throughput of the information processing apparatus 100.

As a matter of course, when the amount of content received by the data receiving module 105 is equal to or larger than the predetermined amount, the data dividing module 125 divides the content.

Division of content causes the processing time in the blockchain to take more than the case of a single target that is to be processed. Therefore, information indicating pending is returned to the transmission source of the content before final information indicating success or rejection is returned.

After that, when information indicating success is received from the transmission destination to which the content parts have been transmitted, the data transmitting module 135 transmits, to the transmission source of the content, information indicating success.

An exemplary process performed by the modules in the information processing apparatus 100 will be described.

In step S1010, the data receiving module 105 receives transaction data, which is content or the like, from a different node, and transmits the transaction data to the data determining module 110.

In step S1020, the data determining module 110 checks the transaction data, and transmits, to the data transmitting module 135, the determination result indicating success, rejection, or pending. The data transmitting module 135 transmits the information to a different node.

In step S1030, if the determination result indicates pending, the data determining module 110 transmits the content to the data dividing process module 115.

In step S1040, the contract control module 130 transmits, to the data transmitting module 135, information indicating that contract data is to be registered. The data transmitting module 135 transmits the information to a different node.

In step S1050, the data receiving module 105 receives information indicating that the registration has been successfully performed, from the node which is the transmission destination in step S1040. The data receiving module 105 transmits, to the contract control module 130, the information indicating the registration success.

In step S1060, the contract control module 130 transmits the contract to the data transmitting module 135. The data transmitting module 135 transmits the contract to the node which is the transmission source of the content.

In step S1070, the data receiving module 105 receives, from a different node, a notification of association with a remittance reservation. The data receiving module 105 transmits, to the contract control module 130, the notification of association with the remittance reservation.

In step S1080, the data dividing module 125 divides content.

In step S1090, the data dividing module 125 transmits the data sections to the data transmitting module 135. The data transmitting module 135 transmits the data sections to the node which is the transmission source of the content.

Figure 2:
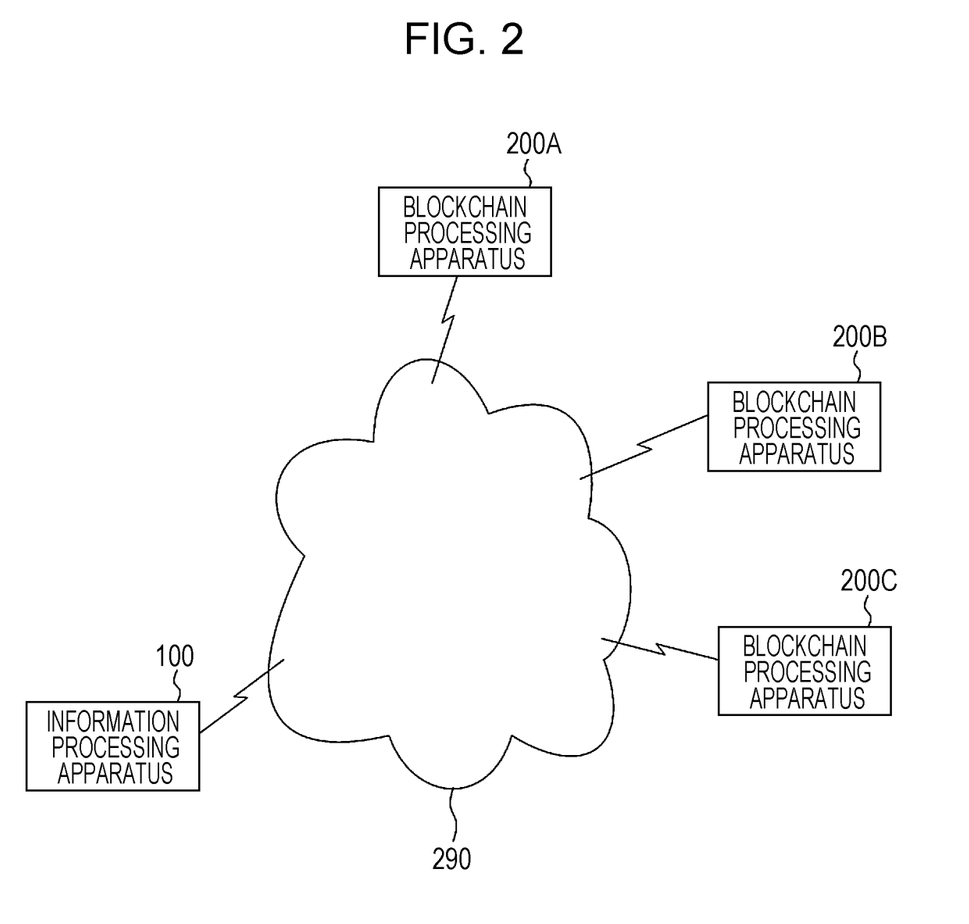
FIG. 2 is a diagram for describing an exemplary system configuration to which the present exemplary embodiment is applied.

FIG. 2 is a diagram for describing an exemplary system configuration to which the present exemplary embodiment is applied.

The information processing apparatus 100, a blockchain processing apparatus 200A, a blockchain processing apparatus 200B, and a blockchain processing apparatus 200C are connected to each other through a communication line 290. The communication line 290 may be wireless, wired, or a combination of these. For example, the Internet, an intranet, and the like serving as a communication infrastructure may be used. The functions of the information processing apparatus 100 may be implemented as a cloud service.

The information processing apparatus 100, the blockchain processing apparatus 200A, the blockchain processing apparatus 200B, and the blockchain processing apparatus 200C form nodes of the blockchain. There are nodes for a wallet, mining, a full blockchain database, network routing, and the like. The information processing apparatus 100 is added as a node. That is, the information processing apparatus 100, which divides broadcasted data as appropriate, is present as a node of the blockchain. The information processing apparatus 100 may be included as having a subset of functions of nodes, such as network routing.

When content, whose amount is not capable of being processed in the blockchain, is broadcasted, nodes other than the information processing apparatus 100 are not able to process the content. Thus, a determination of "invalid" is made. However, if the information processing apparatus 100 is included in the broadcast destinations, the information processing apparatus 100 divides the content so that a blockchain processing apparatus 200, which is a different node, is able to process the content.

The following data may be used as content which is the target of the blockchain.

Assume a situation in which members, who join a project, themselves record their life logs in order to receive proper evaluation about how the members contribute the project result. For example, the life logs correspond to the history of document creation, the history of electronic mail, records of comments, and the like.

When such life log data is used, it is necessary to guarantee validity of the data. In addition, when multiple members, who do not belong to the same organization, collaborate with each other, use of the blockchain is more appropriate than storage of the data in a single management site. This is because the blockchain (distributed ledger) aims at safe storage of data.

The life log data includes data of various formats, such as, not only text data, but also audio data, image data, and moving image data. In addition, the life log data has a size larger than the case of only text data. The transaction data, which is a target of the blockchain, may include contract data having the role of a contract.

<1> The Case of a Public Blockchain

A user of a certain blockchain processing apparatus 200 broadcasts transaction data, which is a large amount of content, in order to register the data in a blockchain.

Since the amount of the content, as it is, is such that the content fails to be stored in a block in the blockchain, a node which has received the content determines that the transaction is invalid, rejects the content, and returns, to the issuing node (data transmission source), a message indicating the rejection. More details will be described below in the processes in steps S352 to S356 in the example in FIG. 3.

If the content may be stored in a block, the node determines that the transmission is valid, propagates the content to the next node, and returns a success message to the issuing node (data transmission source). That is, a miner node creates a block storing a certain number of pieces of transaction data, and adds the block to the chain. More details will be described below by using the processes in steps S302 to S312 illustrated in the example in FIG. 3.

In the case where the nodes, having received the transaction data, include the information processing apparatus 100, if the amount of the transaction data is large enough to be rejected by existing nodes, the transaction data is divided. Then, the contract data described below is registered in the distributed ledger, and a notification is transmitted to the data transmission source. The notification describes a message indicating pending different from success and rejection.

Even without the notification, if the user of the blockchain processing apparatus 200, which is the transmission source of the content, retrieves the state of the broadcasted content, the user may know the contract data. For example, if the broadcasted content has a notification destination (for example, a mail address), the user may transmit a notification to the notification destination. If the content does not have a notification destination, the user may transmit a response to a device (for example, an IP address) from which broadcasting has been performed.

The content is divided into content sections, to which necessary information is added, so that a miner node may normally create a block storing such content sections. Execution of the dividing process may incur a fee (including an incentive). For example, the fee may be paid after all of the content sections are stored in a block. The expression, "after all of the content sections are stored in a block" may include "just after the content sections are stored in a block".

The information processing apparatus 100 divides content. The blockchain processing apparatus 200, which is the transmission source of the content, does not necessarily transmit an instruction for division, and, in the first place, does not necessarily determine whether or not division is necessary to perform. The information added to the content sections includes, in addition to information similar to that of a normal remittance transaction (for example, information that is added to the pre-division data), information necessary for restore. For example, content A, which is divided into three, needs information indicating that each section is a part of content A, and information indicating the combination order necessary for restore. A specific example of these types of information may be the content parts called A-1/3, A-2/3, A-3/3, and so on. "A" of "A-1/3" indicates content A; "1/3" indicates that the entire content is divided into three and this part is the first one.

When a blockchain processing apparatus 200, which is the transmission source of content, accepts a contract, the blockchain processing apparatus 200 signs the contract. The target of the sign may include information about a remittance reservation of the presented fee. The blockchain processing apparatus 200 signs each data section. The signing process is similar to signing of a typical remittance transaction or the like. The established contract forms a pair with the information about the remittance reservation. When it is detected that the payment condition is satisfied, remittance (that is, payment) is automatically conducted. When the fee for the remittance reservation which is set by the blockchain processing apparatus 200, which is the transmission source of the content, is different from the presented fee, a message indicating this may be transmitted to the blockchain processing apparatus 200 which is the transmission source of the content.

<2> The Case of a Private Blockchain

As in "<1> the case of a public blockchain" described above, a fee for the information processing apparatus 100 is not necessary. Thus, when the information processing apparatus 100 receives a large amount of content, the information processing apparatus 100 performs the dividing process. The blockchain processing apparatus 200, which is the transmission source of the content, needs to know whether or not the content has been stored in a block. Thus, processing using the contract as described above may be employed. In this case, since no fees are incurred, signing is not necessary.

<3> Reference to the Registered Content

In a remittance transaction process of the related art, the balance of its own wallet and the transaction history may be referred to. Like this, also in the presented exemplary embodiment, data registered in the distributed ledger may be referred to.

Content registered without division may be referred to according a process similar to that of the related art. The registered content does not include only text. Thus, information indicating the data type is also registered.

The registered content sections may be referred to as the restored content according to the following procedure.

A user of the blockchain processing apparatus 200, which is the transmission source of the content, inputs information for specifying content that is to be referred to, or a condition for retrieval.

The blockchain is searched on the basis of information for specifying the blockchain processing apparatus 200, which is the transmission source of the content, and information which has been input. When there are content sections in the data obtained through the search, the content is restored according to the restore information. That is, parts (content section parts) other than the attribute information are combined. The combining process may be performed by the blockchain processing apparatus 200, which is the transmission source of the content, or by the information processing apparatus 100. In the latter case, a fee may be incurred.

Content registered in the blockchain may be reproduced in the following manner.

(1) For example, in the case where audio data of a presenter, image data which is still images captured at certain timings, and document material, which are obtained in a presentation at a certain meeting, are to be registered in a distributed ledger, assume that the audio data is divided, and the image data and the document material are registered without division. Each piece of data is given the date and time of occurrence of the piece of data as a time stamp. Specifically, the time stamp refers to the time at which the audio data is recorded, the time at which the image data is captured, and the time at which the document material is referred to at the meeting. In this case, the audio data may be divided according to the dates and times at which the image data is captured.

When the data registered in the distributed ledger is to be referred to, the content is restored by using the data sections. The time stamps of the pieces of data are used to reproduce the content in accordance with the dates and times. Thus, the situation of the presentation is reproduced. For example, images are displayed (in a so-called slide show manner) with audio played in the back. Below the images, in accordance with the progress of the presentation, corresponding parts of the document material are displayed.

(2) A process of creating an idea may be reproduced.

In a certain meeting, assume that an idea is created by two members, and that the two members register their progress in a distributed ledger with time stamps. In this case, the process of creating the idea may be reproduced by arranging two lines chronologically. On the basis of the information, the degrees of contribution of the two members on the idea may be discussed.

There may be multiple information processing apparatuses 100. Each information processing apparatus 100 may set a fee for a dividing process. Payment of the fee may be made in advance or at a later time. A blockchain processing apparatus 200, which is a node transmitting a request, may select an information processing apparatus 100. The benefit of end users may be improved through competition between the multiple information processing apparatuses 100.

Figure 3:
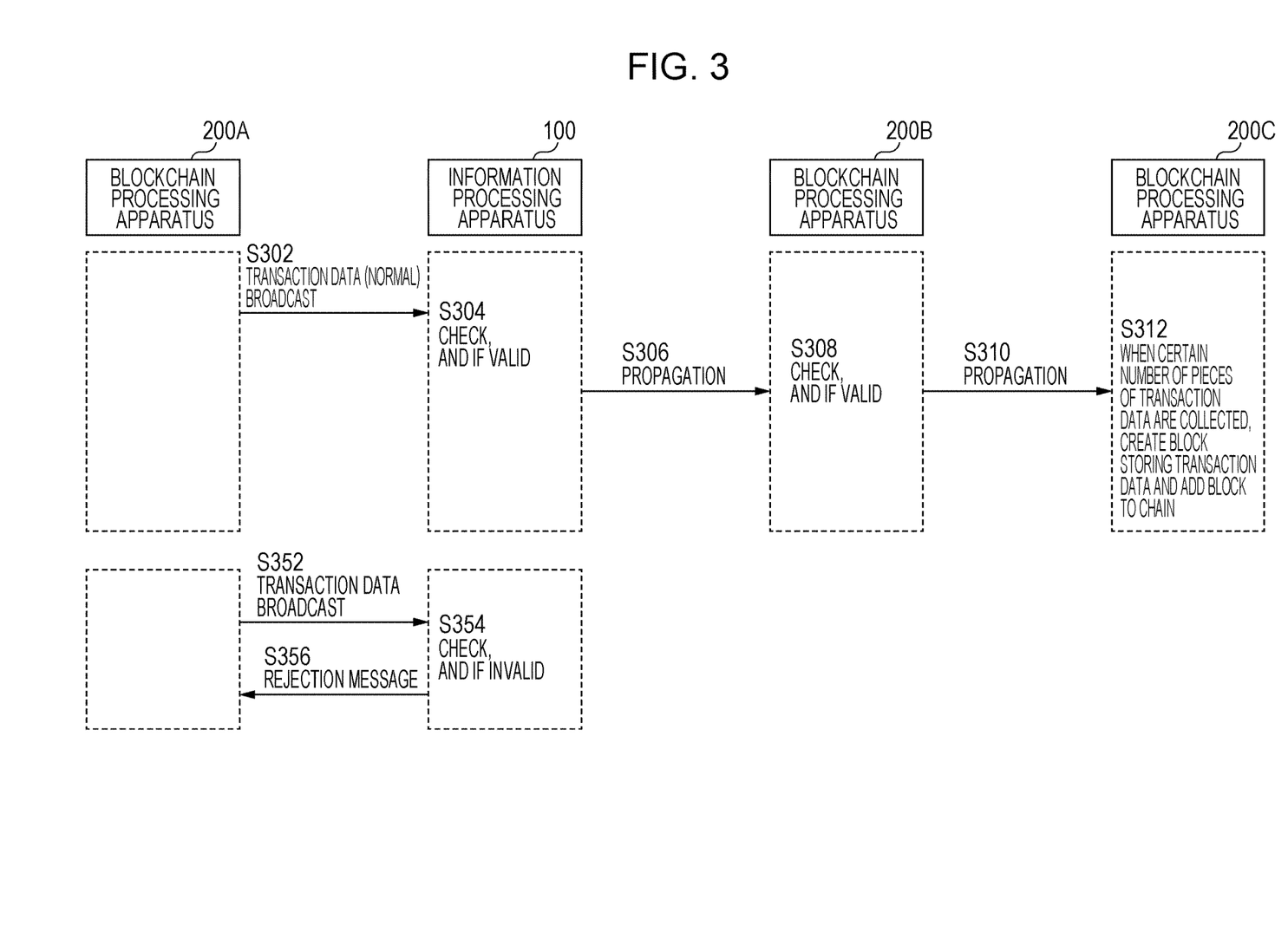
FIG. 3 is a flowchart of an exemplary process according to the present exemplary embodiment.

FIG. 3 is a flowchart of an exemplary process according to the present exemplary embodiment. The exemplary process is an exemplary blockchain process on transaction data which does not need to be divided.

The exemplary processes in steps S302 to S312 are performed when the transaction data is valid. The exemplary processes in steps S352 to S356 are performed when the transaction data is invalid.

In step S302, the blockchain processing apparatus 200A broadcasts transaction data which is received by the information processing apparatus 100, one of the broadcast destinations.

In step S304, the information processing apparatus 100 checks the transaction data. If the transaction data is valid, the process proceeds to step S306.

In step S306, the information processing apparatus 100 propagates the transaction data to the blockchain processing apparatus 200B.

In step S308, the blockchain processing apparatus 200B checks the transaction data. If the transaction data is valid, the process proceeds to step S310.

In step S310, the blockchain processing apparatus 200B propagates the transaction data to the blockchain processing apparatus 200C.

In step S312, when the blockchain processing apparatus 200C collects a certain number of pieces of transaction data, the blockchain processing apparatus 200C creates a block storing the pieces of transaction data, and connects the block to the chain.

Upon completion of the blockchain process, the blockchain processing apparatus 200C propagates a message indicating success in the reverse direction. Specifically, the message is propagated from the blockchain processing apparatus 200C to the blockchain processing apparatus 200B, from the blockchain processing apparatus 200B to the information processing apparatus 100, and from the information processing apparatus 100 to the blockchain processing apparatus 200A.

In step S352, the blockchain processing apparatus 200A broadcasts transaction data which is received by the information processing apparatus 100, one of the broadcast destinations.

In step S354, the information processing apparatus 100 checks the transaction data. If the transaction data is invalid, the process proceeds to step S356.

In step S356, the information processing apparatus 100 transmits a message indicating rejection, to the blockchain processing apparatus 200A.

Figure 4:
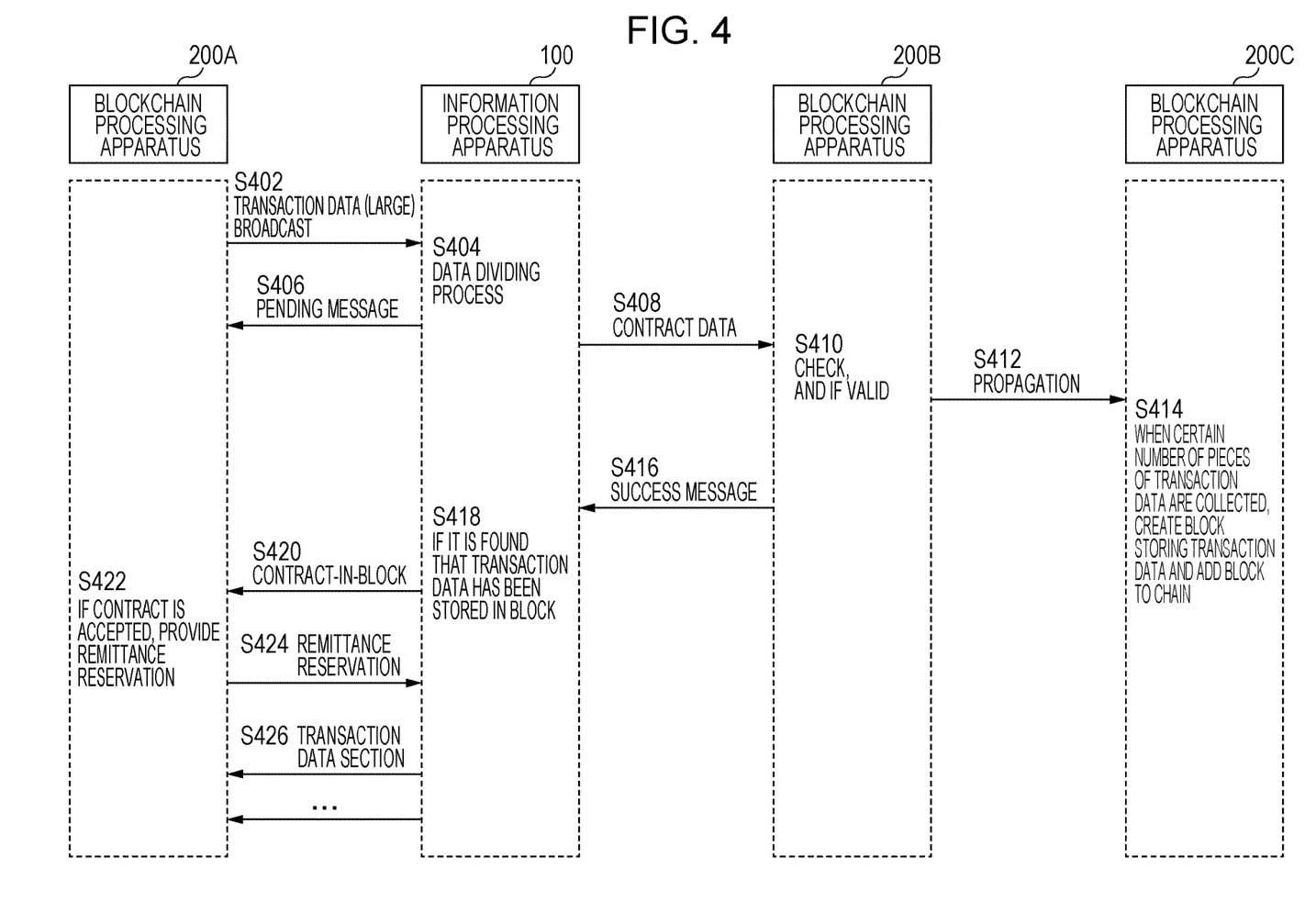
FIG. 4 is a flowchart of an exemplary process according to the present exemplary embodiment.

FIG. 4 is a flowchart of an exemplary process according to the present exemplary embodiment. The exemplary process is an exemplary dividing process performed in the case where dividing transaction data enables the blockchain process to be performed.

In step S402, the blockchain processing apparatus 200A broadcasts transaction data which is received by the information processing apparatus 100, one of the broadcast destinations.

In step S404, the information processing apparatus 100 performs the data dividing process.

The exemplary process indicates the case in which, as a node of receiving a broadcast from the blockchain processing apparatus 200A, the information processing apparatus 100 is disposed. If the information processing apparatus 100 is not disposed as a node of receiving a broadcast from the blockchain processing apparatus 200A, that is, if a blockchain processing apparatus 200, which does not have the function of the information processing apparatus 100, receives the broadcast, as illustrated in the example in FIG. 3, the transaction data is processed as being invalid as in step S354.

In step S406, the information processing apparatus 100 transmits, to the blockchain processing apparatus 200A, a message indicating pending.

In step S408, the information processing apparatus 100 transmits contract data to the blockchain processing apparatus 200B.

In step S410, the blockchain processing apparatus 200B checks the contract data. If the contract data is valid, the process proceeds to step S412.

In step S412, the blockchain processing apparatus 200B propagates the contract data to the blockchain processing apparatus 200C.

In step S414, when the blockchain processing apparatus 200C collects a certain number of pieces of transaction data, the blockchain processing apparatus 200C creates a block storing the pieces of transaction data, and connects the block to the chain.

In step S416, the blockchain processing apparatus 200B transmits, to the information processing apparatus 100, a message indicating success.

In step S418, if the information processing apparatus 100 finds that the transaction data has been stored in a block, the process proceeds to step S420.

In step S420, the information processing apparatus 100 transmits the contract-in-block to the blockchain processing apparatus 200A.

In step S422, if the blockchain processing apparatus 200A accepts the contract, the blockchain processing apparatus 200A provides a remittance reservation.

In step S424, the blockchain processing apparatus 200A transmits the remittance reservation to the information processing apparatus 100. The remittance reservation is propagated to the blockchain processing apparatus 200C, which is a miner node, and is associated with the contract-in-block by the blockchain processing apparatus 200C. The association is notified to the information processing apparatus 100.

In step S426, the information processing apparatus 100 transmits, to the blockchain processing apparatus 200A, transaction data which is a content section. The transmission is performed multiple times, as many as the number of sections.

Figure 5:
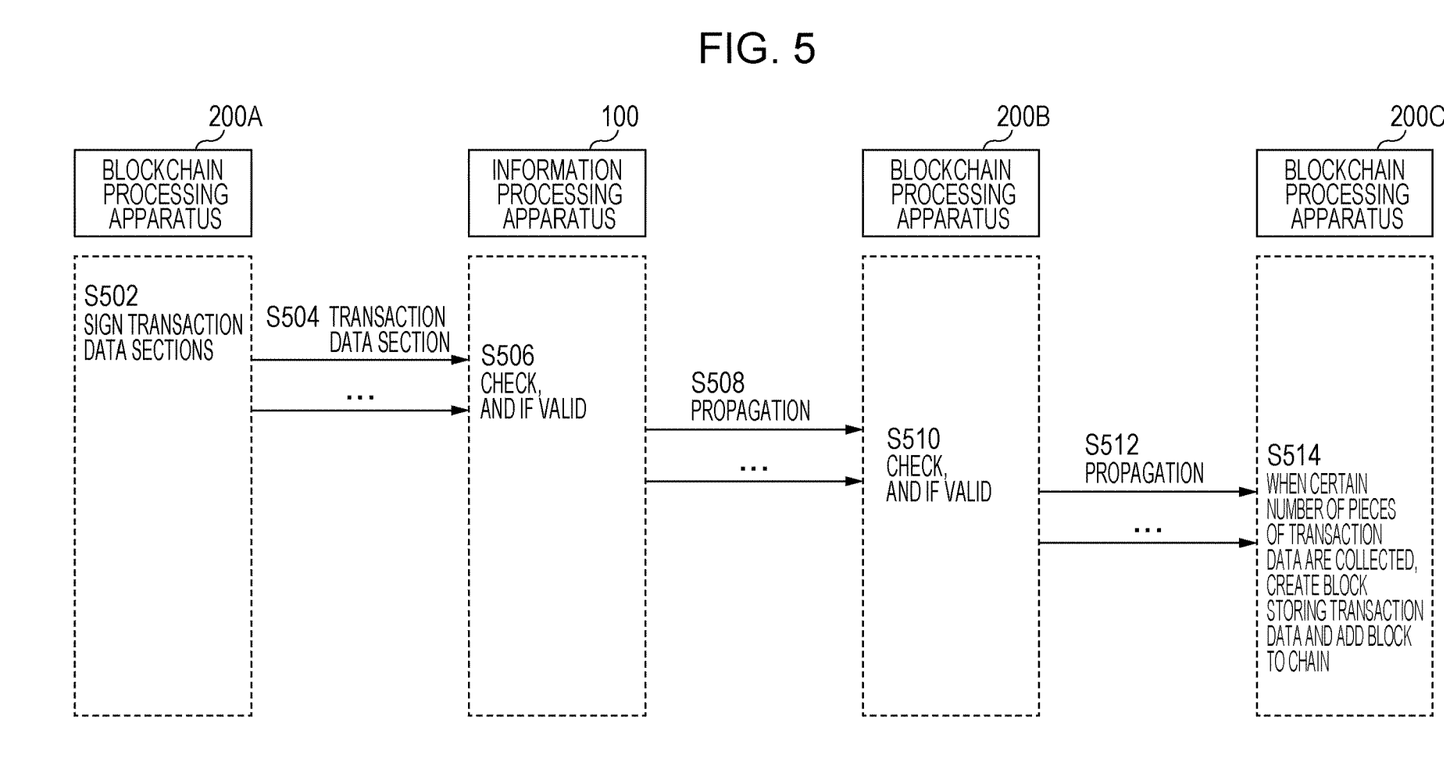
FIG. 5 is a flowchart of an exemplary process according to the present exemplary embodiment.

FIG. 5 is a flowchart of an exemplary process according to the present exemplary embodiment. FIG. 5 illustrates an exemplary process after step S426 in the flowchart illustrated in the example in FIG. 4. Except that the processing targets are the content sections, the exemplary process indicates operations of the related art.

In step S502, the blockchain processing apparatus 200A signs each transaction data section.

In step S504, the blockchain processing apparatus 200A transmits each transaction data section to the information processing apparatus 100.

In step S506, the information processing apparatus 100 checks the transaction data. If the transaction data is valid, the process proceeds to step S508.

In step S508, the information processing apparatus 100 propagates the transaction data to the blockchain processing apparatus 200B.

In step S510, the blockchain processing apparatus 200B checks the transaction data. If the transaction data is valid, the process proceeds to step S512.

In step S512, the blockchain processing apparatus 200B propagates the transaction data to the blockchain processing apparatus 200C.

In step S514, when the blockchain processing apparatus 200C collects a certain number of pieces of transaction data, the blockchain processing apparatus 200C creates a block storing the pieces of transaction data, and connects the block to the chain.

FIGS. 6A to 6D are diagrams for describing an exemplary dividing process according to the present exemplary embodiment. This example describes division of content into three.

Figure 6A:
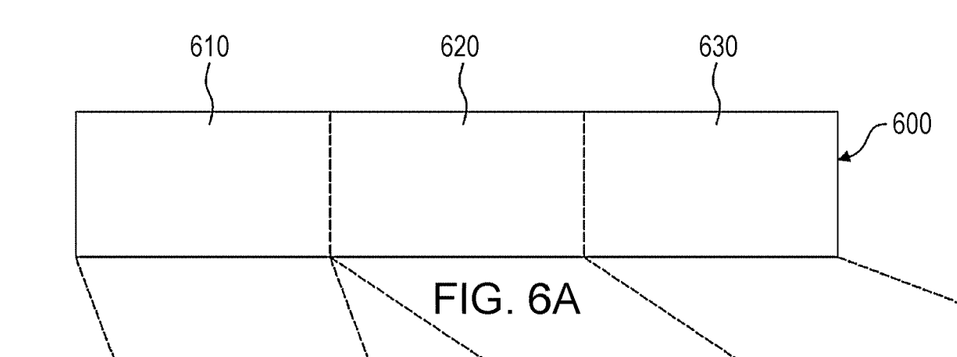
FIGS. 6A to 6D are diagrams for describing an exemplary dividing process according to the present exemplary embodiment.

As illustrated in the example in FIG. 6A, the data dividing module 125 divides transaction data 600 into a data section 610, a data section 620, and a data section 630.

The data dividing module 125 generates restore information 615 for the data section 610, restore information 625 for the data section 620, and restore information 635 for the data section 630. For example, as information indicating the combination order, the data dividing module 125 generates the restore information 615 indicating the first in order, the restore information 625 indicating the second in order, and the restore information 635 indicating the third in order.

Figure 6B:
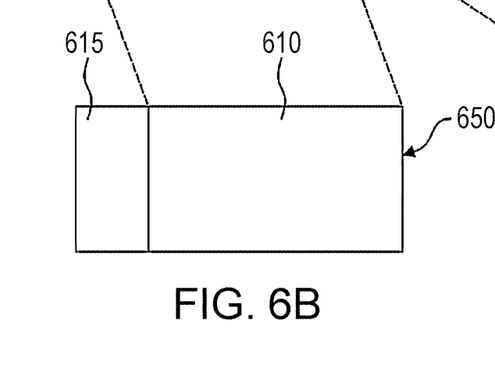
Figure 6C:
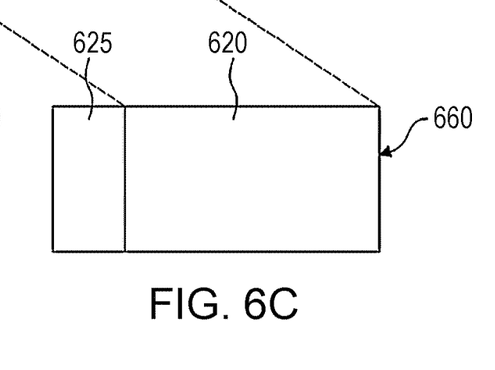
Figure 6D:
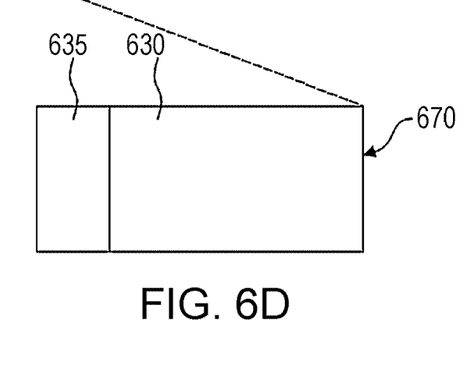

As illustrated in the examples in FIGS. 6B, 6C, and 6D, the data dividing module 125 generates post-division-data 650 including the restore information 615 and the data section 610, generates post-division-data 660 including the restore information 625 and the data section 620, and generates post-division-data 670 including the restore information 635 and the data section 630. These pieces of data are transmitted to a different node.

Figure 7:
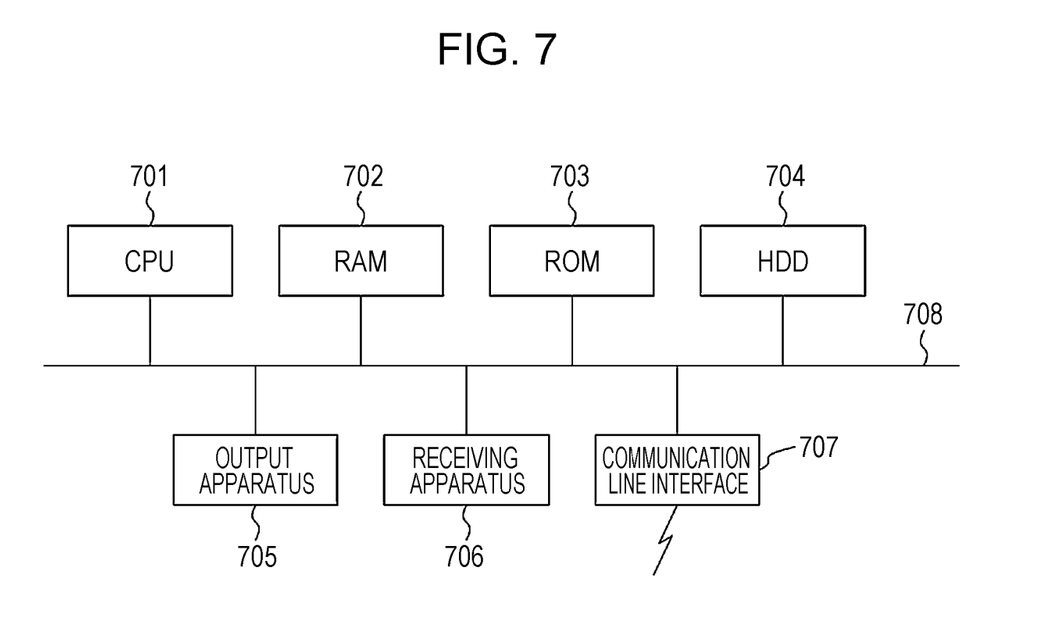
FIG. 7 is a block diagram illustrating an exemplary hardware configuration of a computer for implementing the present exemplary embodiment.

As illustrated in FIG. 7, the hardware configuration of a computer which executes programs serving as the present exemplary embodiment indicates a typical computer. Specifically, a computer or the like which may function as a personal computer or a server may be used. That is, as a concrete example, a CPU 701 is used as a processor (arithmetic logical unit). A RAM 702, a read-only memory (ROM) 703, and a hard disk drive (HDD) 704 are used as storage devices. As the HDD 704, for example, an HDD and a solid state drive (SSD) which is a flash memory may be used. The computer includes the CPU 701, the RAM 702, the ROM 703, the HDD 704, a receiving apparatus 706, an output apparatus 705, a communication line interface 707, and a bus 708. The CPU 701 executes programs, for example, for the data receiving module 105, the data determining module 110, the data dividing process module 115, the data pending module 120, the data dividing module 125, the contract control module 130, and the data transmitting module 135. The RAM 702 is used to store these programs and data. The ROM 703 is used to store, for example, programs for starting the computer. The HDD 704 is an auxiliary storage device for storing data that is to be processed and the like. The receiving apparatus 706 receives data on the basis of users☐ operations (including a motion, a voice, and a line of sight) on a keyboard, a mouse, a touch screen, a microphone, a camera (including a line-of-sight detecting camera), and the like. Examples of the output apparatus 705 include a liquid-crystal display, an organic light-emitting diode (OLED) display, and a speaker. The communication line interface 707 such as a network interface card is used to establish a connection with a communication network. The bus 708 is used to connect these units to each other for data transfer. Such computers may be connected to each other over a network.

For an exemplary embodiment which is achieved by using computer programs and which serves as the above-described exemplary embodiment, the computer programs which are software are read into a system having the hardware configuration, and the software and hardware resources cooperate with each other to achieve the above-described exemplary embodiment.

The hardware configuration in FIG. 7 is merely one exemplary configuration. The present exemplary embodiment is not limited to the configuration in FIG. 7, and may have any configuration as long as the modules described in the present exemplary embodiment may be executed. For example, a graphics processing unit (GPU) (including general-purpose computing on graphics processing units (GPGPU)) may be used as a processor. In addition, a subset of the modules may be formed of dedicated hardware, such as an application specific integrated circuit (for example, an application specific integrated circuit (ASIC)) or a reconfigurable integrated circuit (for example, a field-programmable gate array (FPGA)), and a subset of the modules may be installed in an external system connected through a communication line. In addition, systems having the configuration illustrated in FIG. 7 may be connected to each other through communication lines and may cooperate with each other. In particular, the hardware configuration may be installed in portable information communication equipment (including a portable phone, a smartphone, a mobile device, and a wearable computer), home information equipment, a robot, a copier, a fax, a scanner, a printer, a multi-function device (an image processing device having at least two of the functions of scanning, printing, copying, faxing, and the like), or the like as well as a personal computer.

The programs described above may be provided through a recording medium storing the programs, or may be provided through a communication unit. In these cases, for example, the programs described above may be interpreted as a disclosure of "a computer-readable recording medium that stores a program".

The term "a computer-readable recording medium that stores a program" refers to a computer-readable recording medium that stores programs and that is used for, for example, installation and execution of the programs and distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray☐ Disk, a magneto-optical disk (MO), a flexible disk (FD), a magnetic tape, a hard disk, a ROM, an electrically erasable programmable ROM (EEPROM☐), a flash memory, a RAM, and a secure digital (SD) memory card.

All or a subset of the above-described programs may be stored and distributed by recording them on the recording medium. In addition, the programs may be transmitted through communication, for example, by using a transmission medium of, for example, a wired network or a wireless communication network which is used for a local area network (LAN), a metropolitan area network (MAN), a wide area network (WAN), the Internet, an intranet, an extranet, and the like, or a combination of these. Alternatively, the programs may be carried on carrier waves.

The above-described programs may be a subset or all of other programs, or may be recorded on a recording medium along with other programs. Alternatively, the programs may be recorded on multiple recording media by dividing the programs. The programs may be recorded in any format, such as compression or encryption, as long as it is possible to restore the programs.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a receiving unit;
a determining unit;
a pending unit;
a dividing unit;
an adding unit; and
a transmitting unit, wherein
the receiving unit is configured to receive content which is a target of a blockchain;
the determining unit is configured to determine whether an amount of the received content is greater than or equal to a predetermined amount that the blockchain is capable of processing, the predetermined amount being a maximum amount that the blockchain is capable of processing;
the pending unit is configured to transmit the received content to the dividing unit;
the dividing unit is configured to divide, in response to the determining unit determining that the amount of the received content is greater than or equal to the predetermined amount that the blockchain is capable of processing, the received content into content sections;
the adding unit is configured to add, to the divided content sections from the dividing unit, a first information for generating the received content from the divided content sections; and
the transmitting unit is configured to transmit the added content sections through the blockchain such that the added content sections are stored in the blockchain, the added content sections comprising the first information and the divided content sections.

2. The information processing apparatus according to claim 1, wherein
the receiving unit is further configured to receive the content from a transmission source,
the determining unit is further configured to, in response to determining that the amount of the received content is greater than or equal to the maximum amount that the blockchain is capable of processing, transmit second information indicating pending, and
the transmitting unit is further configured to transmit, to the transmission source, a message, the message comprising the second information indicating pending.

3. An information processing apparatus comprising:
means for receiving content which is a target of a blockchain;
means for determining whether an amount of the received content is greater than or equal to a predetermined amount that the blockchain is capable of processing, wherein the predetermined amount is a maximum amount that the blockchain is capable of processing;
means for transmitting the received content to means for dividing the received content;
the means for dividing, in response to the means for determining that the amount of the received content is greater than or equal to the predetermined amount that the blockchain is capable of processing, the received content into content sections;
means for adding, to the divided content sections, first information for generating the received content from the divided content sections; and
means for transmitting the added content sections through the blockchain such that the added content sections are stored in the blockchain, the added content sections comprising the first information and the divided content sections.

* * * * *